Patented Aug. 29, 1939

2,170,990

UNITED STATES PATENT OFFICE 2,170,990

METHALLYL ETHERS OF PHENYLPHENOLS

Gerald H. Coleman and Garnett V. Moore, Midland, Mich., assignors to The Dow Chemical Company, Midland, Mich., a corporation of Michigan No Drawing. Application September 14, 1938, Serial No. 229,872

7 Claims. (Cl. 260—612)

The invention relates to the 2-methallyl ethers of the phenylphenols. These are new compounds and have been found useful as plasticizers and modifying agents in polymerized vinylidene chloride compositions.

The new compounds may be prepared by reacting 2-methallyl-chloride with a phenylphenol in the presence of an alkali. For example, the phenylphenol may be dissolved in an excess of acetone, anhydrous potassium carbonate added, and the 2-methallyl-chloride gradually added thereto with stirring at the reflux temperature of the reaction mixture. After the 2-methallyl-chloride has been added, heating under reflux may be continued for a period of time sufficient to complete the reaction, after which the reaction mixture is diluted with water and the crude ether product isolated in any suitable manner. While the 2-methallyl-chloride and phenylphenol may be reacted together in any desired amounts, equimolecular proportions thereof and of the potassium carbonate have been found to give a satisfactory yield of the desired compound.

The following examples illustrate certain embodiments of our invention, but are not to be construed as limiting the same:

Example 1

510 grams (3 mols) of 2-phenylphenol and 414 grams (3 mols) of anhydrous potassium carbonate were added to 750 milliliters of acetone. This mixture was heated to its reflux temperature of 63° C. and 271.5 grams (3 mols) of 2-methallyl-chloride added thereto. The mixture was refluxed for 48 hours and thereafter diluted with an excess of water, whereby an oily layer separated. This layer was removed from the excess of water and acetone by decantation, successively washed with water and 20 per cent aqueous sodium hydroxide, and fractionally distilled, whereby there was obtained 456 grams (2.03 mols) of the 2-methallyl ether of 2-phenylphenol as a colorless, mobile liquid boiling at 140°–142° C. at 3 millimeters pressure, and having a specific gravity of 1.043 at 20°/4° C.

Example 2

1 mol each of 3-phenylphenol, 2-methallyl-chloride, and anhydrous potassium carbonate were reacted together, substantially as described in Example 1, in the presence of 250 milliliters of acetone. Upon dilution of the reaction mixture, an oily layer was separated. This crude product was fractionally distilled to obtain 151 grams (0.672 mol) of the 2-methallyl ether of 3-phenylphenol as a colorless, mobile liquid boiling at 160°–161° C. at 4 millimeters pressure, and having a specific gravity of 1.045 at 20°/4° C.

Other 2-methallyl ethers of the phenylphenols were prepared substantially as described in the foregoing examples, among which were the following:

The 2-methallyl ether of 4-phenylphenol, a white, crystalline compound melting at 75.5°–76° C. on recrystallization from 95 per cent ethyl alcohol.

The 2-methallyl ether of 4-chloro-6-phenylphenol, a viscous liquid boiling at 138°–140° C. at 3 millimeters pressure, and having a specific gravity of 1.120 at 20°/4° C.

The 2-methallyl ether of 4-tertiarybutyl-6-phenylphenol, a mobile liquid boiling at 152°–153° C. at 3 millimeters pressure, and having a specific gravity of 0.996.

By substituting other phenylphenols for those shown in the examples, there may be obtained such compounds as the 2-methallyl ethers of 2,4-dichloro-6-phenylphenol, 4-bromo-6-phenylphenol, 2-chloro-4-tertiarybutyl-6-phenylphenol, 4 - iodo - 6 - phenylphenol, 2'-chloro -4- phenyl - phenol, 2',2,6 - trichloro - 4 - phenylphenol, 4' - bromo-2-methyl-4-phenylphenol, 4'-isopropyl-4-phenylphenol, 4-secondary-butyl-6-phenylphenol, 4 - cyclohexyl - 6 - phenylphenol, 2,6-dimethyl-5-phenylphenol, and the like.

The term "phenylphenol" as herein employed includes, in addition to the hydroxy-diphenyls, those phenylphenols substituted in either benzene ring by groups non-reactive with alkali in the described etherification reaction, e. g., halogen, alkyl, etc.

We claim:

1. A 2-methallyl ether of a phenylphenol.
2. A 2-methallyl ether of a nuclear halogenated phenylphenol.
3. A 2-methallyl ether of a nuclear alkylated phenylphenol.
4. A compound having the formula

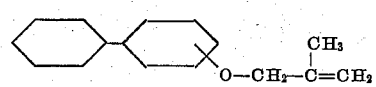

5. 2-methallyl ether of 2-phenylphenol.
6. 2-methallyl ether of 4-chloro-6-phenylphenol.
7. 2 - methallyl ether of 4 - tertiarybutyl - 6 - phenylphenol.

GERALD H. COLEMAN.
GARNETT V. MOORE.